United States Patent [19]

Macpherson et al.

[11] Patent Number: 5,017,394
[45] Date of Patent: May 21, 1991

[54] METHOD FOR MAKING EDIBLE BASE SHAPES HAVING PICTORIAL IMAGES FOR DECORATING FOODSTUFFS

[75] Inventors: John W. Macpherson, Gig Harbor; Lee M. Acree, Tacoma, both of Wash.

[73] Assignee: The Lucks Company, Seattle, Wash.

[21] Appl. No.: 277,484

[22] Filed: Nov. 29, 1988

Related U.S. Application Data

[63] Continuation of Ser. No. 925,413, Oct. 13, 1986, abandoned, which is a continuation-in-part of Ser. No. 924,610, Oct. 28, 1986, abandoned.

[51] Int. Cl.⁵ .................. A21D 2/00; A23L 1/10
[52] U.S. Cl. .................... 426/302; 426/560; 426/578; 426/659; 426/383; 426/502; 426/517; 426/94; 426/103; 426/104
[58] Field of Search .............. 426/104, 383, 512, 515, 426/502, 94, 302, 560, 517; 101/129

[56] References Cited

U.S. PATENT DOCUMENTS

| | | | |
|---|---|---|---|
| 919,736 | 4/1909 | Loesch . | |
| 1,605,903 | 11/1926 | Schuler | 426/515 |
| 2,123,215 | 7/1938 | Thomas | 426/515 |
| 2,347,022 | 4/1944 | Austin | 101/129 |
| 2,353,594 | 7/1944 | Seagren . | |
| 2,394,322 | 2/1946 | McKee . | |
| 2,526,811 | 10/1950 | Dawson | 426/517 |
| 2,578,150 | 12/1951 | Rathke . | |
| 2,610,588 | 9/1952 | Seagren et al. . | |
| 2,895,832 | 7/1959 | Bersey . | |
| 3,057,730 | 10/1962 | Morck | 426/549 |
| 3,192,086 | 6/1965 | Gyurk | 101/129 |
| 3,198,109 | 8/1965 | Dwyer et al. | 101/129 |
| 3,503,345 | 3/1970 | Abrams | 426/104 |
| 3,537,406 | 11/1970 | Ort | 101/123 |
| 3,658,977 | 4/1972 | Baker | 101/129 |
| 3,776,185 | 12/1973 | Kawasaki | 101/129 |
| 3,852,494 | 12/1974 | Williamson | 426/383 |
| 4,024,287 | 5/1977 | Golchert | 426/383 |
| 4,061,783 | 12/1977 | Hoffman et al. | 426/134 |
| 4,285,978 | 8/1981 | Quinlivan | 426/87 |
| 4,388,862 | 6/1983 | Thomas | 101/129 |
| 4,409,893 | 10/1983 | Newman et al. | 101/129 |
| 4,466,994 | 8/1984 | Hubbard et al. | 427/56 |
| 4,531,292 | 7/1985 | Pasternak | 426/383 |
| 4,537,647 | 8/1985 | Foster | 264/297.1 |
| 4,548,825 | 10/1985 | Voss et al. | 426/383 |
| 4,578,273 | 3/1986 | Krugert | 426/383 |
| 4,592,916 | 6/1986 | Akesson | 426/502 |
| 4,668,521 | 5/1987 | Newsteder | 426/383 |

FOREIGN PATENT DOCUMENTS

| | | | |
|---|---|---|---|
| 59-118049 | 7/1984 | Japan | 426/104 |
| 60-126057 | 7/1985 | Japan | 426/104 |
| 161740 | 4/1921 | United Kingdom | 426/383 |
| 196885 | 9/1922 | United Kingdom | 426/383 |
| 422430 | 1/1935 | United Kingdom | 426/383 |
| 543427 | 2/1942 | United Kingdom | 426/383 |
| 628886 | 9/1949 | United Kingdom | 426/383 |
| 786428 | 11/1957 | United Kingdom | 426/517 |

Primary Examiner—Steven Weinstein
Attorney, Agent, or Firm—Gregory W. Moravan

[57] ABSTRACT

A method of using a silk screen to form thin, flat, flexible, free standing base shapes or transfers directly on release paper in their final form from fluid base shape material, all in one step. After drying, pictorial images are then silk screened onto the base shapes to produce the final edible image for decorating foodstuffs. Recipies for preparing the fluid base shape material and a novel machine for peeling the base shapes from the release paper with a spring steel blade are also disclosed.

9 Claims, 3 Drawing Sheets

METHOD FOR MAKING EDIBLE BASE SHAPES HAVING PICTORIAL IMAGES FOR DECORATING FOODSTUFFS

This is a continuation of prior copending application Ser. No. 925,413 filed Oct. 31, 1986, now abandoned, which was a continuation-in-part of prior copending application Ser. No. 924,610 filed Oct. 28, 1986, now abandoned.

BACKGROUND OF THE INVENTION

The present invention relates, in general, to decorating foodstuffs. More particularly, it relates to an unusual and innovative method of making very thin, flat, flexible, free standing edible images or transfers for decorating foodstuffs, such as cakes and cookies, and further relates to formulations of ingredients suitable for making the edible images.

SUMMARY OF THE INVENTION

There has been a long felt need for a method for easily and quickly manufacturing decorative edible images for foodstuffs, such as cakes and cookies, at a very low cost and on a mass production basis. But the goal here is not to manufacture conventional three dimensional decorations such as molded sugar roses. Rather, the goal of the present invention is to instead manufacture edible images that carry pictorial decorative matter, and that are so thin that they are truly ephemeral decorations, in that there is almost nothing there except the pictorial images once the edible images have been applied to foodstuffs.

The edible images or transfers of the present invention comprise very thin, flat, flexible, edible, free standing base shapes upon which pictorial images are subsequently printed.

Perhaps the most significant feature of the present invention is the inventors' discovery that a conventional screen printing device can be used to "screen cast" the base shapes directly into their final, two dimensional forms, rather than using dies to cut the base shapes from a pre-existing sheet of material.

In the screen casting process, a screen printing device is used to simultaneously form the base shapes from edible, fluid base shape material, and to deposit the base shapes onto a carrier medium, such as release paper or foodstuff, all in one step. The term "fluid" is used herein broadly, so that it encompasses the main mechanical properties which the fluid base shape material needs, namely that it be able to flow relatively easily through the openings in the printing screen of the screen printing device; and yet be tacky enough to adhere to the release paper, but not so tacky that it adheres unduly to the printing screen after the base shapes have been formed, so that the printing screen can be easily removed from the base shapes without ruining the completed base shapes After the base shapes have been screen cast, pictorial images may then be applied to the base shapes by screen printing. It is understood that the term "pictorial images" as used herein encompasses not only pictorial images, but also includes language and any other form of decorative matter applied to the base shapes, unless the context should indicate otherwise. Similarly, the pictorial images will be referred to as being applied to the base shapes by "screen printing", it being understood that the term screen printing as used herein encompasses not only conventional screen printing, but also includes any other conventional printing process and any other conventional means and methods of applying the pictorial images to the base shapes, unless the context should indicate otherwise.

Then, as needed, the completed edible images are removed from the release paper and applied to the foodstuffs which are to be decorated.

Screen casting the base shapes directly onto release paper by the above method offers numerous advantages. First, it eliminates the need to manufacture preexisting, free standing sheets of edible material, since the present invention does not manufacture its edible images from such pre-existing, free standing sheets of edible material.

Second, the present invention eliminates the need to die cut, trim, or otherwise cut or size a preexisting, free standing sheet of edible material since a screen printing device is used to screen cast the base shape directly into its final two dimensional form from fluid base shape material, right onto the release paper, all in one step. This has important advantages since printing screens are much less expensive to manufacture than costly steel dies; and since die cutting typically requires first using a die to cut the desired shapes from a pre-existing sheet of material, then stripping the waste material away, then disposing of the waste material, and then finally stacking or otherwise handling the finished shapes, all of which costly, wasteful and time consuming steps are eliminated by the present invention.

Third, because the base shapes are held in place on the release paper by their own tackiness, they need no separate adhesive to hold them on the release paper.

Fourth, because the base shapes are carried throughout processing and storage on the release paper, until use, the base shapes can be formulated to have a wide range of characteristics tailored to different applications, and can also be made extremely thin and fragile. Such thinness and fragility of the base shapes are key characteristics since they give rise to certain very important abilities of the base shapes, namely to become integral with and adhere well to the foodstuffs to which they are applied, to be truly ephemeral carriers of the pictorial images in that there is almost nothing there except the pictorial image once the edible images are applied to the foodstuffs, to be pleasant to eat, and to otherwise have a good mouth feel.

Fifth, screen casting the base shapes permits not only their rapid and precise manufacture in multiples at one time, but it also, very importantly, automatically and very reliably causes the base shapes to stay in register on the release paper (because of their tackiness), for the subsequent accurate screen printing of the desired pictorial images onto the base shapes.

Sixth, screen casting the base shapes enables the finished base shapes to have smooth and flat upper surfaces. This permits the base shapes to subsequently have pictorial images easily screen printed onto their upper surfaces.

Seventh, screen casting the base shapes makes feasable and practical the control of the spacing and the orientation of the base shapes on the release paper, so that with suitable equipment the base shapes could be automatically peeled from the release paper and applied to the foodstuffs.

In another form of the invention, different colored fluid base shape materials may be used with respective different screen printing devices, so that base shapes conveying the desired pictorial images are formed directly, thereby eliminating the need to screen print the pictorial images on undecorated base shapes.

Also disclosed as part of the present invention are several formulations of ingredients for the fluid base shape material which, by way of non-limiting example, demonstrate some of the range of properties which can be imparted to the base shapes. In addition, those formulations also result in base shapes which carry edible food colors and lake colors exceptionally well, with little or no running or creep of the applied colors, resulting in pictorial images on the base shapes of exceptional stability, clarity, and visual impact.

Another aspect of the present invention is an ingenious peeling machine for peeling the edible images from the release paper when the edible images are to be applied to foodstuffs The foregoing is but a brief summary of some of the objects, features, advantages and characteristics of the present invention, since these and further objects, features, advantages and characteristics will be expressly or inherently disclosed to those of ordinary skill in the art to which the present invention pertains, in view of the disclosures herein.

DESCRIPTION OF THE PREFERRED EMBODIMENTS

Figure 1:
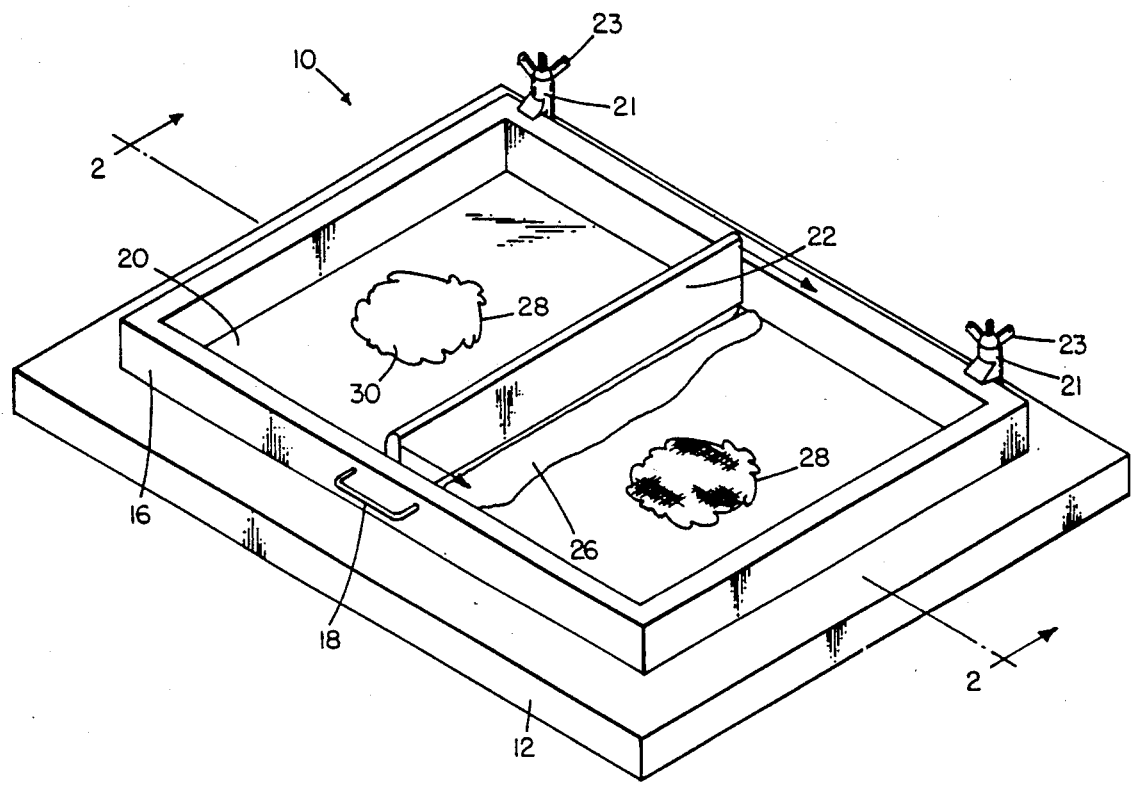
FIG. 1 is a diagramatic perspective view of a screen printing device being used to screen cast the base shapes for the edible images of the present invention.
Figure 2:
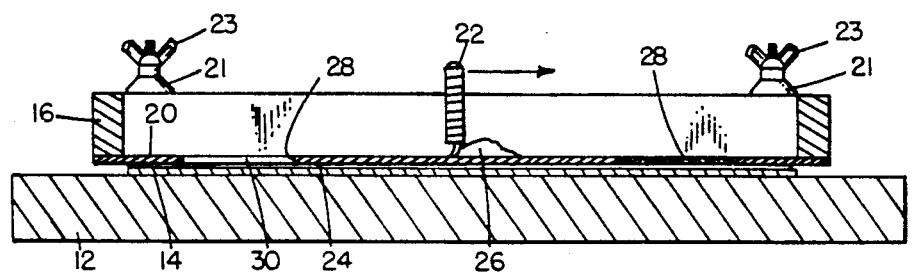
FIG. 2 is a cross-sectional view taken along lines 2—2 of FIG. 1.

Referring now to FIGS. 1 and 2, a conventional screen printing device 10 is seen comprising a base 12, a platen 14, a frame 16 with handle 18, a printing screen 20 securely glued to frame 16, and a pair of conventional hinge-clamps 21 which hold frame 16 (and printing screen 20) to base 12 when their wing nuts are tightened, and which release them when they are loosened.

In operation, the desired frame 16 (and printing screen 20) are first secured in hinge-clamps 21, and are then rotated with handle 18 on hinge-clamps 21 to a vertical position. Release paper 24 is inserted on top of platen 14 which is preferably raised somewhat to ensure release paper 24 is urged into good sealing contact with the underside of printing screen 20 so the base shape material 26 will not run outwardly on release paper 24 past the periphery of base shape openings 28 in printing screen 20 during the screen casting of the base shapes 30.

A conventional vacuum apparatus (not illustrated for clarity) is connected in the conventional way to platen 14 so release paper 24 is sucked firmly down against platen 14.

Frame 16 and its printing screen 20 are then rotated on frame 16's hinge-clamps 21 to a horizontal position until the bottom of printing screen 20 is in firm sealing contact with release paper 24. A squeegee 22 is moved to the left end of frame 16 and a quantity of base shape material 26 is poured along its front edge on top of printing screen 20. Then squeegee 22 is moved in the direction of the arrow over the top of printing screen 20, causing base shape material 26 to fill the base shape openings 28 as the squeegee moves along, and simultaneously urging the base shape material 26 against release paper 24 so it adheres to release paper 24. As best seen in FIG. 2, base shape openings 28 are filled with base shape material 26 from release paper 24 to the top of printing screen 20. Thus, base shapes 30 have a thickness about equal to ½ the thickness of printing screen 20 before base shapes 30 are dried.

After all base shape openings 28 have been filled with base shape material 26, squeegee 22 and any excess base shape material 26 are removed from the top of printing screen 20. Then, by use of handle 18, frame 16 and its printing screen 20 are rotated on frame 16's hinge-clamps 21 to a vertical position. While this is done, the vacuum apparatus keeps release paper 24 (and its newly screen cast base shapes 30) securely on platen 14. The vacuum apparatus is then turned off, permitting release paper 24 and base shapes 30 to be removed from screen printing device 10.

The newly screen casted base shapes 30 on release paper 24 are then dried, as by air drying, until they are firm, flexible, and not tacky to the touch, but not so dry that they crack if flexed. The exact drying time will vary according to the specific base shape material 26 used and the thickness of the base shapes 30, but is easily determined by monitoring a freshly screen casted base shape 30 as it dries under any conventional drying process, until the base shape 30 has the qualities just described which make it suitable for having the desired pictorial image screen printed on it.

After any needed cleaning of screen printing device 10, the process is repeated as necessary to make as many base shapes 30 as are desired.

For clarity, FIGS. 1 and 2 illustrate a simple, manually operated screen printing device 10 and a printing screen 20 having only two base shape openings 28. Naturally, a printing screen 20 having a very large number of base shape openings 28, and the use of automated screen printing devices to screen cast base shapes 30 are within the scope of the present invention. But the particular screen printing device used and the desired degree of automation thereof form no part, per se, of the present invention.

Turning now to related matters, printing screen 20 is preferably made from conventional polyester cloth, but nylon cloth or stainless steel cloth could be used, and release paper 24 can be any conventional food compatable release paper, such as silicone release paper, by way of non-limiting example. Printing screen 20 is prepared, using conventional techniques, from any food compatable materials, such as from any conventional water resistant photosensitive diazo emulsion suitable for use with food products, by way of non-limiting example.

Base shapes 30 have a thickness which is preferably in the range of about six to fifteen one-thousandths of an inch thick, but base shapes 30 may be as thick as fifty one-thousandths of an inch, or more, by multiple screen casted depositions of the same base shapes on top of each other; or may be as thin as two one-thousandths of an inch thick. The limiting factor on the thinness of the base shapes 30 is that if they are too thin they become, as a practical matter, difficult to apply to the foodstuffs without breaking, or collapsing. Thicker base shapes do not have this problem, but if they are too thick, they may become too noticeable on the foodstuffs to which they are applied.

The thickness of base shapes 30 is, in general, governed by the thickness and mesh count of the screening used to make the printing screen 20, as well as by the viscosity of the base shape material 26.

The viscosity of the base shape material 26 is pertinent since if base shape material 26 has too low a viscosity it will tend to run after the printing screen 20 is removed during the screen casting process, or form surface tension holes in the surface of the base shapes 30.

Printing screen 20 may have, by way of non-limiting example, a mesh size of from 40 (strands per inch) which will produce base shapes 30 which are in the range of from four to seven one-thousandths of an inch thick, all the way down to a mesh size 16 (strands per inch) which will produce base shapes 30 which are in the range of from ten to fifteen one-thousandths of an inch thick (or more, when multiple screen casted depositions are used, as was noted above).

As an alternative to a printing screen 20 being used to screen cast base shapes 30, a solid plate of any food compatable material could be substituted which had the base shape openings 28 cut or otherwise formed therein. In such case, the thickness of the plate would help to govern the thickness of the base shapes 30 which it produced. The term screen printing device as used herein is used broadly enough to include a conventional screen printing device utilizing such a plate in lieu of a printing screen 20.

Figure 3:
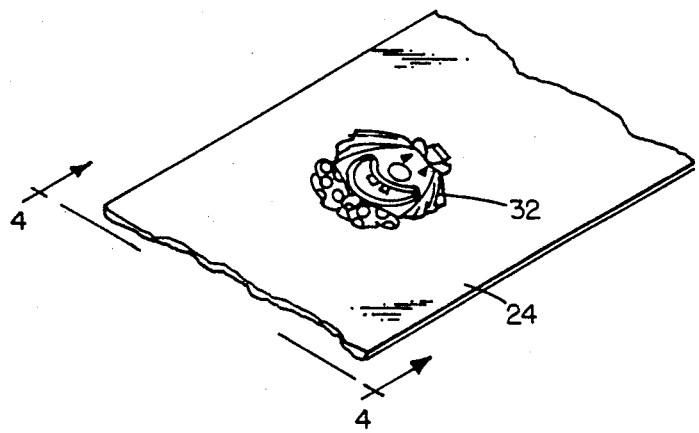
FIG. 3 is a perspective view of a finished edible image on release paper, with the release paper partly broken away.
Figure 4:
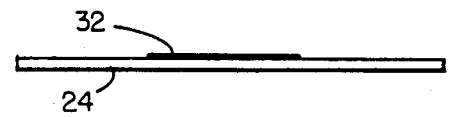
FIG. 4 is a side elevation view of FIG. 3.

After the base shapes 30 are dried as described earlier, conventional screen printing processes are used to apply the desired pictorial images thereon to produce the final edible image 32 seen in FIGS. 3 and 4. However to get high quality pictorial images, instead of using conventional food compatible inks to print the pictorial images, it is preferred that special "edible inks" be used. Such edible inks are applied to the base shapes 30 with conventional screen printing devices and are formulated as follows:

| 1. Water | 1000 parts |
| 2. Titanium Dioxide | 4 parts |
| 3. Preservative, Sorbistat K | 5 parts |
| 4. Cold water swelling corn starch | 170 parts |
| 5. Maltodextrin | 170 parts |
| 6. Cake flour | 80 parts |

The maltodextrin preferably has a dextrose equivalent of five. The preservative may comprise potassium sorbate. Items 4-6 are sifted together and then added to items 1-3 which have been previously blended together. This results in a white "edible ink" which can be used as is for a white color. For any other colors, conventional food colorings are added to this white edible ink until the desired color is obtained.

Alternatively, either the First Example or the Third Example of the base shape material given below can be used as an acceptable edible ink after they have been whitened, as is also described below. They also can be colored with conventional food colorings to produce any desired color edible ink.

In printing pictorial images on base shapes 30 with such edible inks, a conventional screen printing device is preferably used, preferably with a printing screen having a mesh size of 70 (strands per inch).

Figure 5:
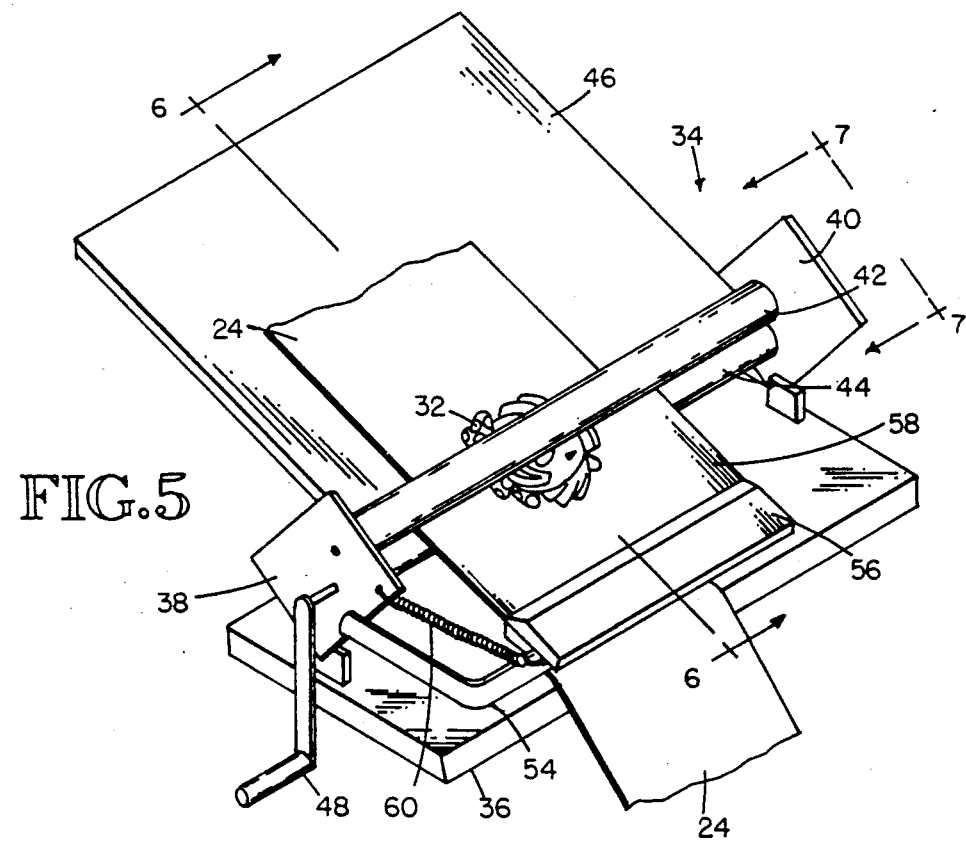
FIG. 5 is a diagrammatic perspective view of a peeling machine for removing edible images from the release paper.
Figure 6:
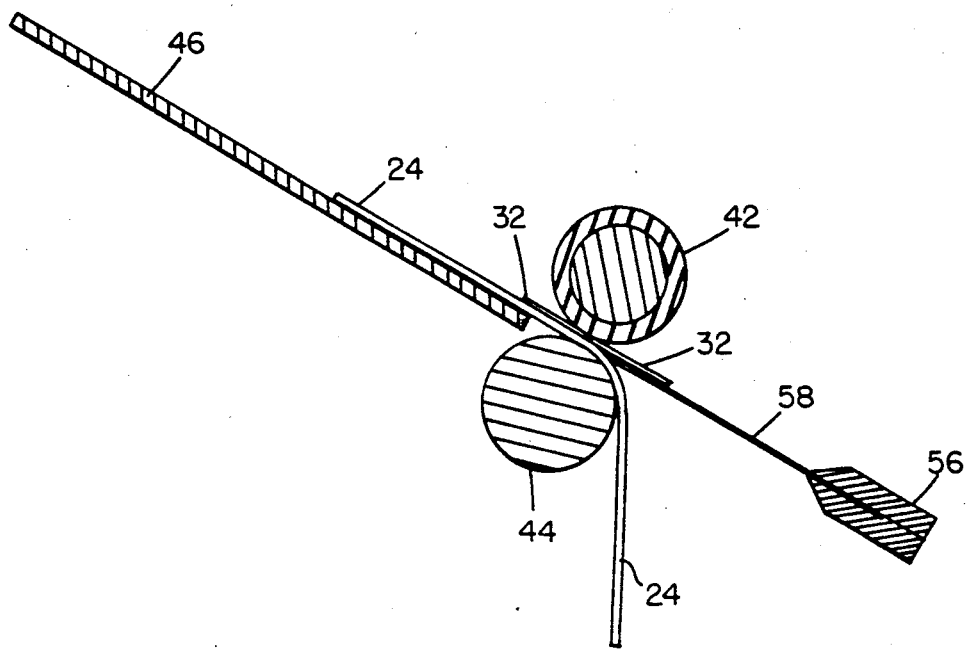
FIG. 6 is a cross-sectional view taken along line 6—6 of FIG. 5, with background parts omitted for clarity.
Figure 7:
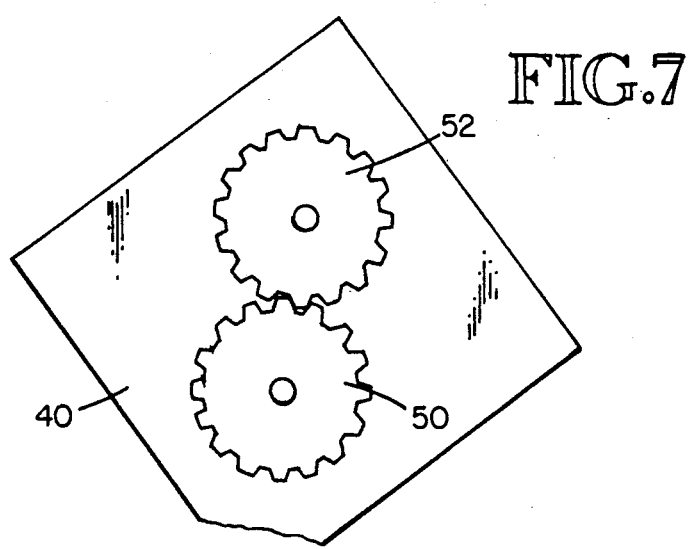
FIG. 7 is an end elevational view taken along line 7—7 of FIG. 5, with parts broken away and background parts omitted for clarity.

Turning now to FIGS. 5 and 6, they diagrammatically illustrate a peeling machine 34 for peeling edible images 32 from their release paper 24. Peeling machine 34 comprises a base 36 supporting a pair of roller end plates 38, 40 between which are mounted an upper rubber roller 42 and a lower steel roller 44. Also mounted between roller end plates 38, 40 is an inclined feed plate 46. A manual crank 48 drives lower roller 44 which, in turn, as seen in FIG. 7, drives upper roller 42 through lower roller gear 50 and upper roller gear 52. Rollers 42, 44 have the same diameter, as do gears 50, 52, so the surfaces of rollers 42, 44 do not slip with respect to each other during operation of the peeling machine 34.

Pivotally mounted to roller end plate 38 is a support arm 54 for holder 56 for spring steel peeler blade 58. Tension spring 60 pulls holder 56 and peeler blade 58 against the top surface of release paper 24.

In operation, release paper 24 with edible images 32 is placed on inclined feed plate 46, which causes the lower end of release paper 24 to be fed under the influence of gravity to rollers 42, 44. Peeler blade 58 is manually urged away from rollers 42, 44 as crank 48 is turned enough to cause rollers 42, 44 to engage and start to feed release paper 24 out from between rollers 42, 44. Peeler blade 58 is then released so spring 60 can urge peeler blade 58 against the top surface of release paper 24. Turning of crank 48 is then resumed to advance release paper 24 and edible image 32, until the leading edge of edible image 32 contacts the knife edge of peeler blade 58, which then completely strips edible image 32 from release paper 24 as release paper 24 continues to advance.

The freed edible image 32 is then collected as it falls free from peeler blade 58, under the influence of gravity, for application to a foodstuff which is to be decorated. The application of edible images 32 to foodstuffs may be done manually, or may be done automatically by suitable machinery which is beyond the scope of the present invention.

Several examples for base shape material 26 will now be given, by way of non-limiting example.

| FIRST EXAMPLE | |
| --- | --- |
| 1. Cake Flour | 500 parts |
| 2. Cold water swelling corn starch | 186 parts |
| 3. Corn syrup solids | 170 parts |
| 4. 120° F. water | 1000 parts |
| 5. Invert sugar | 179 parts |
| 6. Preservative, Sorbistat K | 4.25 parts |
| 7. Emulsifier, Polysorbate 80 | 143 parts |
| 8. Vanilla Decor-Frost 425 | 300 parts |

The preservative may comprise potassium sorbate, but any suitable food compatible preservative may be used. The emulsifier may comprise polyglycerol esters. The vanilla Decor-Frost 425 is made by Brokay Products, Inc., 999 Gantry Road, Philadelphia, PA 19115. It is a ready to use icing which comprises sugar; partly hydrogenated vegetable shortening; coconut, soybean, cottonseed and/or palm oil; artificial colors; lecithin; salt and artificial flavors.

Items 1–3 are sifted together and dry mixed; and are then added all at once to items 4–6 which have been previously mixed until dissolved. Items 1–6 are then mixed together with a mixer. Item 8 is melted in a double boiler to 140°–150° F. and added to and mixed with items 1–6, taking care to avoid whipping. Item 7 is then mixed with items 1–6 and 8 until smooth. The final mixture is then allowed to stand for at least four hours, and is remixed briefly before use.

If it is desired to turn the final mixture white, then about 12.5 parts of titanium dioxide is dispersed in dissolved items 4–6 prior to the mixed dry items 1–3 being added thereto.

The above example for base shape material 26 produces base shapes 30 for edible images 32, which are preferably softened by heat. Thus, such edible images 32 are preferably applied to foodstuffs such as iced cookies, chocolate covered candies, and the like, while the icing or chocolate is molten or hot. The molten or hot icing or chocolate softens the edible image 32 which then conforms and adheres to the molten or hot icing or chocolate, even if the icing or chocolate is uneven and has curves, depressions and protrusions.

If the foodstuff cooled before edible images 32 could be applied, then prior to application of edible images 32 the foodstuff is heated, as with infrared heat lamps.

| SECOND EXAMPLE | |
|---|---|
| 1. Water | 290 parts |
| 2. Dried fondant sugar | 150 parts |
| 3. Maltodextrin | 60 parts |
| 4. Cold water swelling corn starch | 40 parts |
| 5. Cake flour | 160 parts |
| 6. Cake shortening | 40 parts |
| 7. Glycerin | 20 parts |
| 8. Propylene glycol | 20 parts |
| 9. Emulsifier, Polysorbate 80 | 20 parts |

The maltodextrin preferably has a dextrose equivalent of one. The emulsifier may comprise polyglycerol esters.

Items 3–5 are sifted together and added to previously dissolved items 1 and 2. Items 6–9 are melted together and added to items 1–5 and blended until smooth.

If it is desired to turn the final mixture white, about 4 parts of titanium dioxide are dispersed in dissolved items 1 and 2 prior to the mixed dry items 3–5 being added thereto.

The above second example for base shape material 26 produces base shapes 30 for edible images 32 which are preferably softened by heat. Thus, the second example is used in the manner described above for the first example.

| THIRD EXAMPLE | |
|---|---|
| 1. Invert syrup | 50 parts |
| 2. Dried fondant sugar | 50 parts |
| 3. Glycerin | 36 parts |
| 4. Water | 140 parts |
| 5. Maltodextrin | 50 parts |
| 6. Cold water swelling corn starch | 25 parts |
| 7. Cake flour | 100 parts |

The maltodextrin preferably has a dextrose equivalent of five. Items 5, 6 and 50 parts of 7 are first sifted together and then added to items 1–4 which have been previously blended together. One hour later, the last 50 parts of item 7 are blended in.

If it is desired to turn the final mixture white, about 2.25 parts of titanium dioxide are added to item 4 as items 1–4 are blended together.

This example for base shape material 26 produces base shapes 30 for edible images 32 which are preferably softened by moisture. Thus, such edible images 32 are preferably used to decorate foodstuffs such as uniced cookies and cakes, iced cakes, pies, puddings, ice cream, and the like. When edible images 32 are applied to such foodstuffs, the moisture therefrom softens the edible image 32 causing it to conform and adhere to the foodstuff, even if the foodstuff has an uneven surface with curves, depressions and protrusions. When applied to steamy foodstuffs fresh from the oven, they conform and adhere in a few minutes, while they may take several hours to do the same on a cool iced cake.

If the foodstuffs are too dry, then the foodstuff and/or the edible image 32 could be lightly misted with water prior to the application of the edible image to the foodstuff.

From the foregoing, various further applications, modifications and adaptations of the methods and apparatus disclosed herein will now be apparent to those skilled in the art to which the present invention pertains, within the scope of the following claims.

What is claimed is:

1. A method of manufacturing at least one edible base shape having at least one edible pictorial image thereon; wherein said base shape is dimensioned and adapted to be placed on and adhere to a foodstuff to decorate said foodstuff; wherein said base shape has a predetermined, two dimensional configuration and has thickness; wherein said edible base shape is manufactured from at least one edible, fluid material; and wherein said method comprises the steps of:

(a) selecting said edible, fluid material to have a composition such that when said edible, fluid material is dried said edible base shape formed therefrom has the properties when at room temperature of being both flexible and free standing:

(b) shaping said edible, fluid material into said predetermined, two dimensional configuration by filling at least one printing opening in a printing screen in a screen printing means with said edible, fluid material, wherein said at least one printing opening has said predetermined, two dimensional configuration, and by screen casting said edible, fluid material through said at least one printing opening while simultaneously depositing said edible, fluid material in said predetermined, two dimensional configuration onto a releasable carrier medium by using said screen printing means to form said base shape; wherein said base shape has a thickness in the range of from about two one-thousandths of an inch to about fifty one-thousandths of an inch; wherein said edible fluid material is selected to have a composition such that it is able to flow relatively easily through said at least one printing opening, and yet be tacky enough to adhere to said releasable carrier medium, but not be so tacky that said edible fluid material adheres unduly to said printing screen after said edible base shape has been formed, to enable said printing screen to be easily removed from said edible base shape without ruining the formed base shape;

(c) drying said edible, fluid material in said predetermined, two dimensional configuration until it is firm enough when it is at room temperature to be removed intact from said releasable carrier medium as said edible base shape; and (d) screen printing said at least one edible pictorial image onto said edible base shape.

2. The method according to claim 1, wherein said method further comprises the step of:

(e) selecting said edible, fluid material to have a composition such that said edible base shape has the further property of being at least substantially softenable by moisture, to help enable said edible base shape to conform to a surface of said foodstuff on which it is adapted to be placed, even if said surface of said foodstuff is not flat.

3. The method according to claim 2, wherein said method further comprises the step of:

(f) selecting said edible, fluid material to have a composition comprising: about 50 parts invert syrup, about 50 parts sugar, about 36 parts glycerin, about 140 parts water, about 50 parts maltodextrin, about 25 parts starch, and bout 100 parts flour.

4. The method according to claim 3, wherein said method further comprises the step of:

(g) selecting said edible, fluid material to have a composition wherein said sugar is dried fondant sugar; wherein said starch is cold water swelling corn starch; and wherein said flour is cake flour.

5. The method according to claim 1, wherein said method further comprises the step of:

(e) selecting said edible, fluid material to have a composition such that said edible base shape has the further property of being at least substantially softenable by a temperature above room temperature, to help enable said edible base shape to conform to a surface of said foodstuff on which it is adapted to be placed, even if said surface of said foodstuff is not flat.

6. The method according to claim 5, wherein said method further comprises the step of:

(f) selecting said edible, fluid material to have a composition comprising about 500 parts flour; about 186 parts starch; about 170 parts corn syrup solids; about 1000 parts water; about 179 parts sugar; about 143 parts emulsifier; and about 300 parts ready to use icing comprising sugar; partly hydrogenated vegetable shortening; at least one of coconut oil, soybean oil, cottonseed oil and palm oil; artificial colors; lecithin; salt and artificial flavors.

7. The method according to claim 6, wherein said method further comprises the step of:

(g) selecting said edible, fluid material to have a composition wherein said flour is cake flour; wherein said starch is cold water swelling corn starch; and wherein and said sugar is invert sugar.

8. The method according to claim 5, wherein said method further comprises the step of:

(f) selecting said edible, fluid material to have a composition comprising: about 290 parts water, about 150 parts sugar, about 60 parts maltodextrin, about 40 parts starch, about 160 parts flour, about 40 parts shortening, about 20 parts glycerin, about 20 parts propylene glycol, and about 20 parts emulsifier.

9. The method according to claim 8, wherein said method further comprises the step of:

(g) selecting said edible fluid material to have a composition wherein said sugar is dried fondant sugar; wherein said starch is cold water swelling corn starch; wherein said flour is cake flour; and wherein shortening is cake shortening.

* * * * *